United States Patent
Tanaka (10) Patent No.: US 11,476,046 B2
(45) Date of Patent: Oct. 18, 2022

(54) MULTILAYER CERAMIC CAPACITOR

(71) Applicant: Murata Manufacturing Co., Ltd., Nagaokakyo (JP)

(72) Inventor: Akira Tanaka, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 29 days.

(21) Appl. No.: 17/089,765

(22) Filed: Nov. 5, 2020

(65) Prior Publication Data

US 2021/0166874 A1 Jun. 3, 2021

(30) Foreign Application Priority Data

Nov. 29, 2019 (JP) ................ JP2019-216268

(51) Int. Cl.
*H01G 4/005* (2006.01)
*C04B 35/468* (2006.01)
*H01G 4/30* (2006.01)
*H01G 4/12* (2006.01)

(52) U.S. Cl.
CPC ......... *H01G 4/005* (2013.01); *C04B 35/4682* (2013.01); *H01G 4/12* (2013.01); *H01G 4/30* (2013.01)

(58) Field of Classification Search
CPC . H01G 4/30; H01G 4/005; H10G 4/12; C04B 35/4682
USPC .................. 361/321.2, 303, 301.4, 321.1
See application file for complete search history.

(56) References Cited

U.S. PATENT DOCUMENTS

| 9,478,357 B2 * | 10/2016 | Wada | H01C 7/18 |
| 10,347,421 B2 * | 7/2019 | Chung | H01C 7/10 |
| 2006/0256504 A1 * | 11/2006 | Kojima | H01G 4/01 361/311 |
| 2015/0116902 A1 | 4/2015 | Sakai | |
| 2015/0122537 A1 * | 5/2015 | Yamada | H01G 2/065 361/301.4 |
| 2018/0277305 A1 | 9/2018 | Kawakami et al. | |

FOREIGN PATENT DOCUMENTS

| CN | 112614697 A * | 4/2021 | ............ H01G 4/008 |
| JP | 2001-155959 A | 6/2001 | |
| JP | 2001-244138 A | 9/2001 | |
| JP | 2002-015942 A | 1/2002 | |

(Continued)

*Primary Examiner* — Arun Ramaswamy
(74) *Attorney, Agent, or Firm* — Keating & Bennett, LLP (57) ABSTRACT

A multilayer ceramic capacitor includes a multilayer body including dielectric layers and first and second inner electrodes that are laminated, and first and second outer electrodes. Each of the first inner electrodes includes a first opposing electrode portion and a first extending electrode portion. The first extending electrode portions at least positioned in a vicinity of the first and second principal surfaces in a lamination direction among the first inner electrodes include a first bent portion bent inward and a second bent portion bent outward in the lamination direction. A distance between vertices of the first and second bent portions in the lamination direction in the first inner electrodes positioned in the vicinity of the first and second principal surface in a lamination direction is larger than a distance in the first inner electrodes positioned in a central portion in the lamination direction.

17 Claims, 7 Drawing Sheets

(56) References Cited

FOREIGN PATENT DOCUMENTS

| | | | |
|---|---|---|---|
| JP | 2004-095687 | A | 3/2004 |
| JP | 2006-128282 | A | 5/2006 |
| JP | 2007-123389 | A | 5/2007 |
| JP | 2008198655 | A * | 8/2008 |
| JP | 2010-199168 | A | 9/2010 |
| JP | 2012-054330 | A | 3/2012 |
| JP | 2015-111650 | A | 6/2015 |
| JP | 2015-159140 | A | 9/2015 |
| JP | 2018-157119 | A | 10/2018 |

* cited by examiner

MULTILAYER CERAMIC CAPACITOR

CROSS REFERENCE TO RELATED APPLICATIONS

This application claims the benefit of priority to Japanese Patent Application No. 2019-216268 filed on Nov. 29, 2019. The entire contents of this application are hereby incorporated herein by reference.

BACKGROUND OF THE INVENTION

1. Field of the Invention

The present invention relates to a multilayer ceramic capacitor including a plurality of dielectric layers and a plurality of inner electrodes which are laminated.

2. Description of the Related Art

There have been known multilayer ceramic capacitors having an outer electrode formed on a surface of a multilayer body in which a plurality of inner electrodes and a plurality of dielectric layers are alternately laminated. The outer electrode is electrically connected to the inner electrodes.

As one of such multilayer ceramic capacitors, Japanese Unexamined Patent Application Publication No. 2010-199168 describes a multilayer ceramic capacitor having a structure in which a plurality of first inner electrodes and a plurality of second inner electrodes are alternately laminated with dielectric layers interposed therebetween, the first inner electrodes are extended toward a first outer electrode and connected to the first outer electrode, and the second inner electrodes are extended toward a second outer electrode and connected to the second outer electrode.

In the multilayer ceramic capacitor described in Japanese Unexamined Patent Application Publication No. 2010-199168, the density of an extended portion where the inner electrode is extended to the outer electrode is low compared with the density of a portion where the first inner electrode and the second inner electrode are opposed to each other in the lamination direction, and therefore, a structural defect in which the inner electrode in the extended portion separates from the dielectric layer may occur.

SUMMARY OF THE INVENTION

Preferred embodiments of the present invention provide multilayer ceramic capacitors that are each capable of reducing or preventing an occurrence of a structural defect in which an inner electrode separates from a dielectric layer.

A multilayer ceramic capacitor according to a preferred embodiment of the present invention includes a multilayer body including a plurality of dielectric layers, a plurality of first inner electrodes, and a plurality of second inner electrodes that are laminated, and including a first principal surface and a second principal surface opposed to each other in a lamination direction of the dielectric layers and the first and second inner electrodes, a first lateral surface and a second lateral surface opposed to each other in a width direction perpendicular or substantially perpendicular to the lamination direction, a first end surface and a second end surface opposed to each other in a length direction perpendicular or substantially perpendicular to the lamination direction and the width direction, a first outer electrode electrically connected to the first inner electrodes and provided on a surface of the multilayer body, and a second outer electrode electrically connected to the second inner electrodes and provided on a surface of the multilayer body. Each of the first inner electrodes includes a first opposing electrode portion opposed to the second inner electrode when viewed in the lamination direction, and a first extending electrode portion extended from the first opposing electrode portion to the first outer electrode, the first extending electrode portions of the first inner electrodes at least positioned adjacent to or in a vicinity of the first principal surface and the second principal surface in the lamination direction among all of the first inner electrodes include a first bent portion bent inward in the lamination direction and a second bent portion positioned between the first bent portion and the first opposing electrode portion and bent outward in the lamination direction, and a distance between a vertex of the first bent portion and a vertex of the second bent portion in the lamination direction in the first inner electrodes positioned adjacent to or in a vicinity of the first principal surface and the second principal surface in the lamination direction is larger than the distance in the first inner electrodes positioned in a central portion in the lamination direction.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described in detail with reference to the drawings, and the features of the present invention will be specifically described.

First Preferred Embodiment

Figure 1:
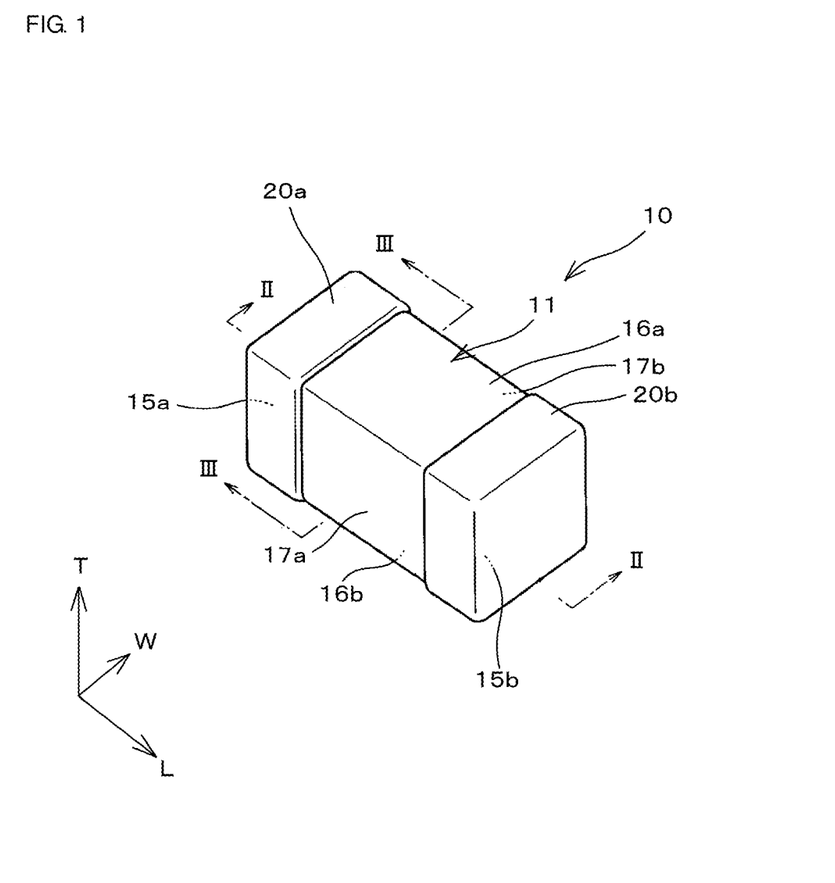
FIG. 1 is a perspective view schematically illustrating a multilayer ceramic capacitor according to a first preferred embodiment of the present invention.
Figure 2:
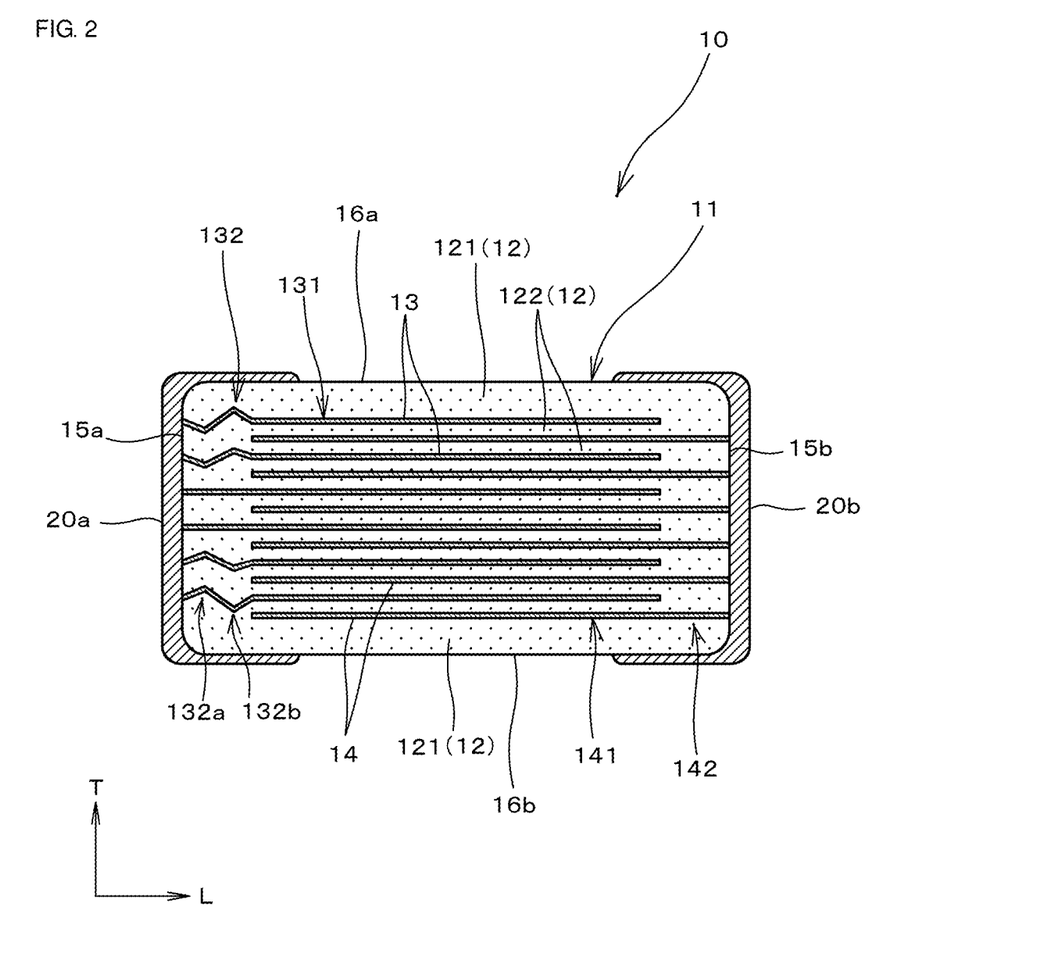
FIG. 2 is a schematic sectional view taken along a line II-II in the multilayer ceramic capacitor illustrated in FIG. 1.
Figure 3:
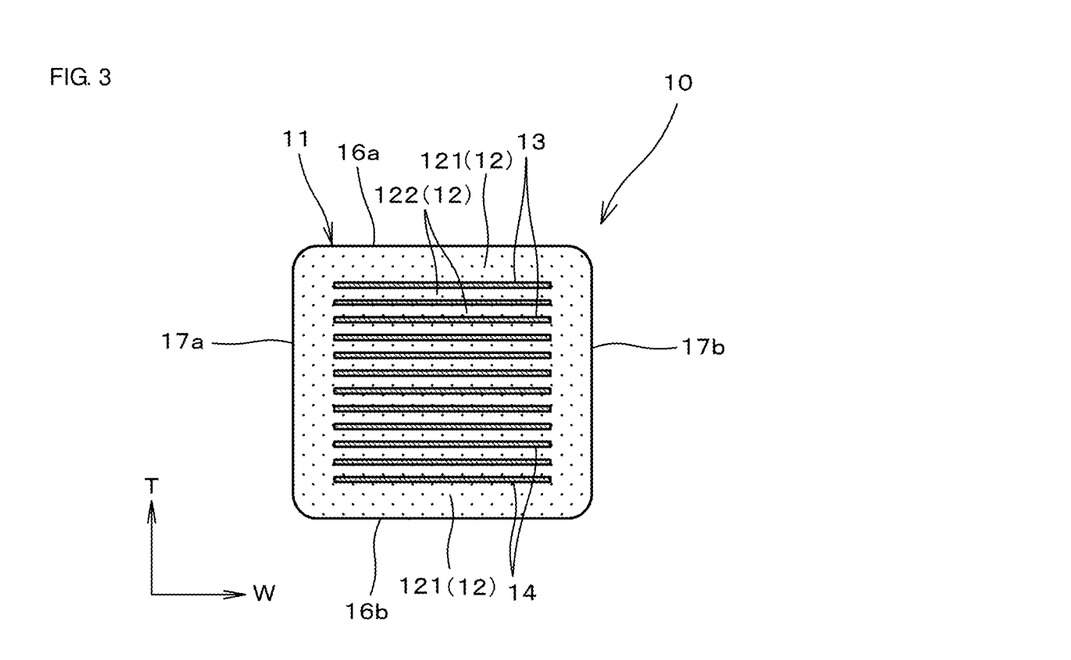
FIG. 3 is a schematic sectional view taken along a line in the multilayer ceramic capacitor illustrated in FIG. 1.

FIG. 1 is a perspective view schematically illustrating a multilayer ceramic capacitor 10 according to a first preferred embodiment of the present invention. FIG. 2 is a schematic sectional view taken along a line II-II in the multilayer ceramic capacitor 10 illustrated in FIG. 1. FIG. 3 is a schematic sectional view taken along a line III-III in the multilayer ceramic capacitor 10 illustrated in FIG. 1.

As illustrated in FIG. 1 to FIG. 3, the multilayer ceramic capacitor 10 is an electronic component having a rectangular or substantially rectangular parallelepiped shape, and includes a multilayer body 11 and a pair of outer electrodes 20a and 20b provided on the surface of the multilayer body 11. The pair of outer electrodes 20a and 20b are opposed to each other as illustrated in FIG. 1.

Here, a direction in which the outer electrodes 20a and 20b defining a pair are opposed to each other is defined as a length direction L of the multilayer ceramic capacitor 10. A direction in which a dielectric layer 12 and inner electrodes 13 and 14, described later, are laminated is defined as a lamination direction T. A direction perpendicular or substantially perpendicular to both of the length direction L and the lamination direction T is defined as a width direction W. Any two directions of the length direction L, the lamination direction T, and the width direction W are perpendicular or substantially perpendicular to each other.

The multilayer body 11 includes a first end surface 15a and a second end surface 15b opposed to each other in the length direction L, a first principal surface 16a and a second principal surface 16b opposed to each other in the lamination direction T, and a first lateral surface 17a and a second lateral surface 17b opposed to each other in the width direction W.

Corners and ridges of the multilayer body 11 are preferably rounded. Here, the corner is a portion where three surfaces of the multilayer body 11 meet, and the ridge is a portion where two surfaces of the multilayer body 11 meet.

The multilayer body 11 includes a plurality of dielectric layers 12 and the plurality of inner electrodes 13 and 14 that are laminated as illustrated in FIG. 2 and FIG. 3. The inner electrodes 13 and 14 include a first inner electrode 13 and a second inner electrode 14. More specifically, the multilayer body 11 has a structure in which the first inner electrodes 13 and the second inner electrodes 14 are alternately laminated in the lamination direction T with the dielectric layers 12 interposed therebetween.

The dielectric layer 12 includes an outer dielectric layer 121 positioned outside of the outermost inner electrodes 13 and 14 in the lamination direction T, and an inner dielectric layer 122 positioned between two inner electrodes 13 and 14 adjacent to each other in the lamination direction T as illustrated in FIG. 2 and FIG. 3.

More specifically, the outer dielectric layer 121 is a layer positioned between the inner electrode 13 that is positioned outermost in the lamination direction T and the first principal surface 16a of the multilayer body 11 or a layer positioned between the inner electrode 14 that is positioned outermost in the lamination direction T and the second principal surface 16b of the multilayer body 11. Further, the inner dielectric layer 122 is a layer positioned between the first inner electrode 13 and the second inner electrode 14 adjacent to each other in the lamination direction T.

The dielectric layer 12 is preferably made of a ceramic material including, for example, $BaTiO_3$, $CaTiO_3$, $SrTiO_3$, $SrZrO_3$, or $CaZrO_3$ as a main component. A sub-component such as, for example, a Mn compound, an Fe compound, a Cr compound, a Co compound, or a Ni compound that is lower in content than the main component may be added to the main component. The thickness of the dielectric layer 12 is preferably equal to or greater than about 0.3 μm and equal to or less than about 100 μm, for example.

The first inner electrode 13 and the second inner electrode 14 are layered in parallel or substantially in parallel to the first principal surface 16a and the second principal surface 16b of the multilayer body 11. However, some of the plurality of first inner electrodes 13 and second inner electrodes 14 may be inclined without being parallel or substantially parallel to the first principal surface 16a and the second principal surface 16b of the multilayer body 11. In addition, some of the plurality of first inner electrodes 13 and second inner electrodes 14 may include a through-hole.

The first inner electrode 13 is extended to the first end surface 15a of the multilayer body 11, and is electrically connected to a first outer electrode which will be described later. The second inner electrode 14 is extended to the second end surface 15b of the multilayer body 11, and is electrically connected to a second outer electrode which will be described later.

Note that the multilayer body 11 may include an inner electrode that is not exposed to the surface other than the first inner electrode 13 and the second inner electrode 14.

The first inner electrode 13 includes a first opposing electrode portion 131 opposed to the second inner electrode 14 when viewed in the lamination direction T, and a first extending electrode portion 132 extended from the first opposing electrode portion 131 to a first outer electrode 20a. The second inner electrode 14 includes a second opposing electrode portion 141 opposed to the first inner electrode 13 when viewed in the lamination direction T, and a second extending electrode portion 142 extended from the second opposing electrode portion 141 to a second outer electrode 20b.

The first opposing electrode portion 131 of the first inner electrode 13 and the second opposing electrode portion 141 of the second inner electrode 14 are opposed to each other with the dielectric layer 12 interposed therebetween. This structure generates a capacitance and defines and functions as a capacitor.

The first inner electrode 13 and the second inner electrode 14 preferably include a metal such as Ni, Cu, Ag, Pd, Pt, Fe, Ti, Cr, Sn, or Au, or such as an alloy including any of these metals, for example. The first inner electrode 13 and the second inner electrode 14 may include, as a co-material, a ceramic material that is the same or substantially the same as the dielectric ceramic included in the dielectric layer 12. In that case, the proportion of the co-material contained in the first inner electrode 13 and the second inner electrode 14 is equal to or less than about 20 vol %, for example.

The materials of all of the inner electrodes 13 and 14 need not be the same, and may be different from each other. Further, any one of the inner electrodes 13 and 14 may include portions in which materials are different from each other.

Figure 4:
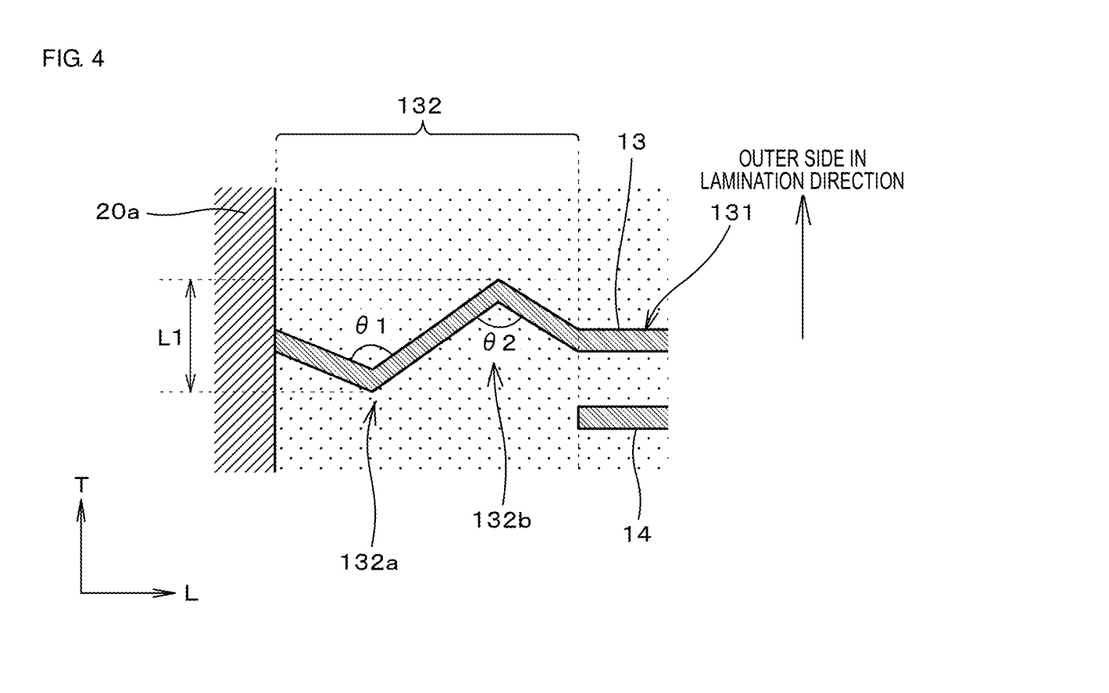
FIG. 4 is an enlarged view of a portion including a first extending electrode portion of a first inner electrode positioned in an outermost portion in a lamination direction in the sectional view illustrated in FIG. 2.

FIG. 4 is an enlarged view of a portion including the first extending electrode portion 132 of the first inner electrode 13 positioned in the outermost portion in the lamination direction T in the sectional view illustrated in FIG. 2.

In the multilayer ceramic capacitor 10 according to the present preferred embodiment, the first extending electrode portions 132 of the first inner electrodes 13 at least positioned adjacent to or in a vicinity of the first principal surface 16a and the second principal surface 16b in the lamination direction T among all of the first inner electrodes 13 include a first bent portion 132a and a second bent portion 132b. The first bent portion 132a is bent inward in the lamination direction T, and the second bent portion 132b is positioned between the first bent portion 132a and the first opposing electrode portion 131 and is bent outward in the lamination direction T. The first bent portion 132a is bent so as to protrude inward in the lamination direction T, and the second bent portion 132b is bent so as to protrude outward in the lamination direction T, as illustrated in FIG. 4.

In the multilayer ceramic capacitor 10 according to the present preferred embodiment, no first bent portion 132a and no second bent portion 132b are included in the first inner electrodes positioned in the vicinity of a central portion in the lamination direction T, and the first bent portion 132a and the second bent portion 132b are included in other first inner electrodes 13. However, the first bent portion 132a and the second bent portion 132b may be included also in the first inner electrodes 13 positioned in the vicinity of the central portion in the lamination direction T.

A distance L1 (see FIG. 4) between a vertex of the first bent portion 132a and a vertex of the second bent portion 132b in the lamination direction T in the first inner electrodes 13 positioned adjacent to or in a vicinity of the first principal surface 16a and the second principal surface 16b in the lamination direction T is larger than the distance in the first inner electrodes 13 positioned in the vicinity of the central portion in the lamination direction T.

The first inner electrode 13 positioned further outside in the lamination direction T has a larger distance L1 between the vertex of the first bent portion 132a and the vertex of the second bent portion 132b in the lamination direction T.

For example, the distance L1 between the vertex of the first bent portion 132a and the vertex of the second bent portion 132b in the first inner electrode 13 positioned in the outermost portion in the lamination direction T is preferably equal to or greater than about 5 μm and equal to or less than about 40 μm, for example, in the following condition. The dimension of the multilayer ceramic capacitor 10 is preferably, for example, about 3.2 mm in the length direction L, about 2.5 mm in the width direction W, and about 2.5 mm in the lamination direction T. The number of layers of the inner electrodes 13 and 14 is preferably, for example, 940, and the dimension of the first extending electrode portion 132 in the length direction L is preferably, for example, about 200 μm.

When a combination of the first inner electrode 13 and the dielectric layer 12 or a combination of the second inner electrode 14 and the dielectric layer 12 is defined as a single layer, the thickness of the single layer is preferably equal to or greater than about 1.5 μm and equal to or less than about 2.5 μm, for example, in the above-described multilayer ceramic capacitor 10 having the size of about 3.2 mm by about 2.5 mm by about 2.5 mm. When the thickness of the single layer in the region where the first opposing electrode portion 131 and the second opposing electrode portion 141 are present, viewed in the lamination direction T, is defined as a reference, the ratio of the thickness of the single layer in the region where the first extending electrode portion 132 or the second extending electrode portion 142 is present with respect to the reference is preferably equal to or greater than about 60% and equal to or less than about 80%, and is about 67%, for example. When the ratio of the thickness is less than about 60%, separation between the inner electrode 13 and the dielectric layer 12 or separation between the inner electrode 14 and the dielectric layer 12 may occur, or a crack from a gap may occur. The ratio of the thickness is more preferably equal to or greater than about 65% and equal to or less than about 75%, for example. Note that the thickness of the single layer in the region where the first extending electrode portion 132 or the second extending electrode portion 142 is present is the thickness of the dielectric layer 12 alone.

The bending angle $\theta 1$ of the first bent portion 132a is equal to or greater than about 100° and less than about 180°, for example. For example, the bending angle $\theta 1$ of the first bent portion 132a of the first inner electrode 13 positioned in the outermost portion in the lamination direction T is preferably about 140°.

The bending angle $\theta 2$ of the second bent portion 132b is equal to or greater than about 100° and less than about 180°, for example.

In the present preferred embodiment, the first bent portion 132a and the second bent portion 132b are present at all positions in the width direction W of the first inner electrode 13. However, the first bent portion 132a and the second bent portion 132b may be present only at predetermined positions in the width direction W of the first inner electrode 13.

The first outer electrode 20a is provided on the first end surface 15a of the multilayer body 11. In the present preferred embodiment, the first outer electrode 20a is provided on the entire or substantially the entire first end surface 15a of the multilayer body 11 and extends to the first principal surface 16a, the second principal surface 16b, the first lateral surface 17a, and the second lateral surface 17b from the first end surface 15a. The first outer electrode 20a is electrically connected to the first inner electrode 13.

As illustrated in FIG. 4, the first extending electrode portions 132 of the first inner electrodes 13 positioned adjacent to or in a vicinity of the first principal surface 16a and the second principal surface 16a in the lamination direction T are connected to the first outer electrode 20a in a direction inclined with respect to a direction in which the first outer electrode 20a and the second outer electrode 20b are opposed to each other. In the present preferred embodiment, the direction in which the first outer electrode 20a and the second outer electrode 20b are opposed to each other corresponds to the length direction L.

The second outer electrode 20b is provided on the second end surface 15b of the multilayer body 11. In the present preferred embodiment, the second outer electrode 20b is provided on the entire or substantially the entire second end surface 15b of the multilayer body 11 and extends to the first principal surface 16a, the second principal surface 16b, the first lateral surface 17a, and the second lateral surface 17b from the second end surface 15b. The second outer electrode 20b is electrically connected to the second inner electrode 14.

In the multilayer ceramic capacitor 10 according to the present preferred embodiment, no bent portion is present in the second extending electrode portion 142 of the second inner electrode 14. The second extending electrode portion 142 of the second inner electrode 14 therefore is connected to the second outer electrode 20b in a direction in which the first outer electrode 20a and the second outer electrode 20b are opposed to each other.

The first outer electrode 20a and the second outer electrode 20b include an underlying electrode layer and a plating layer disposed on the underlying electrode layer, for example. The thickness of the first outer electrode 20a and the second outer electrode 20b is preferably equal to or greater than about 5 μm and equal to or less than about 100 μm, for example.

The underlying electrode layer includes at least one layer among, for example, a baked electrode layer, a resin electrode layer, and a thin-film electrode layer, as will be described below.

The baked electrode layer is a layer including glass and a metal, and may be a single layer or may be a plurality of layers. The baked electrode layer preferably includes a metal such as Cu, Ni, Ag, Pd, Ti, Cr, and Au, or such as an alloy containing these metals, for example.

The baked electrode layer is formed by applying a conductive paste including glass and a metal to the multilayer body and baking the conductive paste. The baking may be performed simultaneously with the firing of the unfired multilayer body, or may be performed after firing of the multilayer body.

The resin electrode layer may be formed as a layer including conductive particles and thermosetting resin, for example. The resin electrode layer may be provided directly on the ceramic element body without providing the baked electrode layer. The resin electrode layer may be a single layer or may be a plurality of layers.

The thin-film electrode layer is a layer formed by deposition of metal particles and preferably has a thickness of equal to or less than about 1 μm, for example, and may be formed by a known thin-film forming process such as a sputtering process or a vapor deposition process, for example.

The plating layer disposed on the underlying electrode layer preferably includes at least one of a metal such as Cu, Ni, Ag, Pd, and Au, or such as an alloy of Ag and Pd, for example. The plating layer may be a single layer or may be a plurality of layers. However, the plating layer preferably has a two-layer structure including a Ni plating layer and a Sn plating layer. The Ni plating layer prevents the underlying electrode layer from being eroded by the solder when the multilayer ceramic capacitor is mounted. Further, the Sn plating layer improves the wettability of the solder when the multilayer ceramic capacitor 10 is mounted.

Note that the first outer electrode 20a and the second outer electrode 20b may not include the above-described underlying electrode layer, and may include the plating layer directly disposed on the multilayer body 11. In this case, the plating layer is directly connected to the first inner electrodes 13 or the second inner electrodes 14.

In the multilayer ceramic capacitor 10 according to the present preferred embodiment, the first extending electrode portions 132 of the first inner electrodes 13 at least positioned adjacent to or in a vicinity of the first principal surface 16a and the second principal surface 16b in the lamination direction T among all of the first inner electrodes 13 include the first bent portion 132a and the second bent portion 132b. The first bent portion 132a is bent inward in the lamination direction T, and the second bent portion 132b is bent outward in the lamination direction T. Accordingly, an area in which the first extending electrode portion 132 of the first inner electrode 13 is in contact with the dielectric layer 12 is increased, and the presence of the first bent portion 132a and the second bent portion 132b which are bent in the lamination direction T generates an anchor effect. The anchor effect may reduce or prevent the separation of the first inner electrode 13 from the dielectric layer 12, and more specifically, may reduce or prevent the separation of the first extending electrode portion 132 in the region in which the density in the multilayer body 11 is low.

Further, the contraction of the first inner electrode 13 inward in the length direction L may be reduced or prevented during the firing in the manufacturing process of the multilayer ceramic capacitor 10. An inner electrode may contract inward in the length direction during firing in a multilayer ceramic capacitor in the related art in which no bent portion is present in an inner electrode. However, in the multilayer ceramic capacitor 10 according to the present preferred embodiment, the first extending electrode portion 132 of the first inner electrode 13 includes the first bent portion 132a and the second bent portion 132b which are bent in the lamination direction T, and thus the contraction of the first inner electrode 13 inward in the length direction L during the firing may be reduced or prevented. This makes it possible to reduce or prevent the occurrence of a connection failure between the first inner electrode 13 and the first outer electrode 20a.

In the multilayer ceramic capacitor 10 according to the present preferred embodiment, the first extending electrode portions 132 of the first inner electrodes 13 positioned adjacent to or in the vicinity of the first principal surface 16a and the second principal surface 16b in the lamination direction T are connected to the first outer electrode 20a in a direction inclined with respect to the direction in which the first outer electrode 20a and the second outer electrode 20b are opposed to each other. The configuration described above increases the connection area compared with the configuration in which the first extending electrode portion is connected to the first outer electrode in the direction in which the first outer electrode and the second outer electrode are opposed to each other. This makes it possible to improve the connectivity between the first inner electrode 13 and the first outer electrode 20a, and the separation of the first outer electrode 20a may be reduced or prevented.

Method for Manufacturing Multilayer Ceramic Capacitor

A non-limiting example of a method for manufacturing the above-described multilayer ceramic capacitor 10 will be described below.

First, a ceramic green sheet, a conductive paste for an inner electrode, and a conductive paste for an outer electrode are prepared, respectively. A known ceramic green sheet may be used, and the ceramic green sheet may be obtained by coating a ceramic slurry containing a ceramic powder, a resin component, and a solvent on a substrate and drying the ceramic slurry, for example.

The ceramic slurry preferably includes CaTi, $ZrO_3$, $SrZrO_3$, $BaTiO_3$, BaTi, or $CaO_3$, for example. The ceramic slurry may further include a dispersant or a resin component that defines and functions as a binder. The solids concentration in the ceramic slurry is preferably equal to or greater than about 10 vol % and equal to or less than about 27 vol %, for example, and the pigment volume concentration (PVC) of the ceramic particles in the solid components is preferably equal to or greater than about 65% and equal to or less than about 95%, for example.

Subsequently, an inner electrode pattern is formed by coating the conductive paste for an inner electrode on the ceramic green sheet. The conductive paste for an inner electrode may be coated by any printing method such as screen printing, intaglio printing, letterpress printing, or inkjet printing, for example. Intaglio printing or letterpress printing may be performed by offset printing, for example. Further, the inner electrode patterns may be formed by printing a plurality of times using the same or different printing methods.

The conductive paste for an inner electrode preferably includes a metal such as, for example, Ni, Cu, Ag, Pd, Pt, Fe, Ti, Cr, Sn, or Au, or particles made of a precursor of the metal, and a solvent. The conductive paste for an inner electrode may further include a dispersant or a resin component that serves as a binder.

The viscosity of the conductive paste for an inner electrode is preferably equal to or greater than about 5 mPa·s and equal to or less than about 50 Pa·s, for example. The solid content concentration in the conductive paste for an inner electrode is preferably equal to or greater than about 9 vol % and equal to or less than about 20.5 vol %, for example, and the pigment volume concentration (PVC) of the metal particles in the solid components is preferably equal to or greater than about 70% and equal to or less than about 95%, for example. The size of the metal particles is preferably equal to or greater than about 10 nm and equal to or less than about 500 nm, for example.

Subsequently, a predetermined number of ceramic green sheets on which no inner electrode pattern is formed are laminated, and the ceramic green sheets on which an inner electrode pattern is formed are successively laminated thereon. Further, a predetermined number of ceramic green sheets on which no inner electrode pattern is formed are laminated thereon to manufacture a mother multilayer body.

Figure 5A:
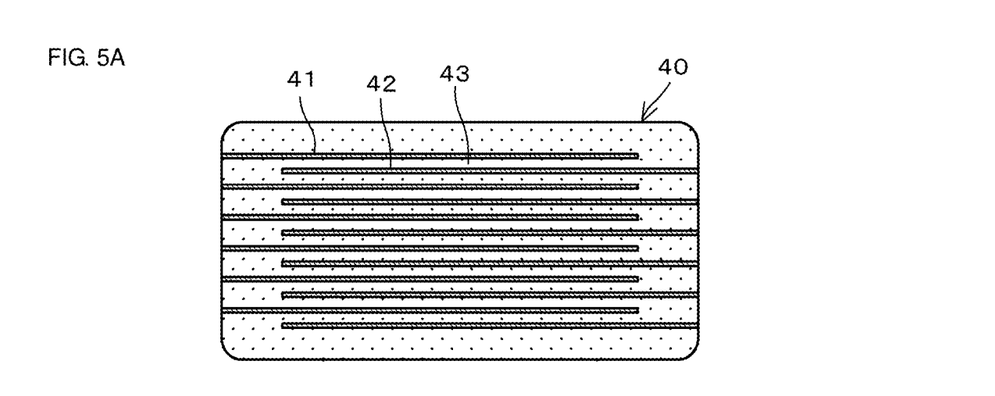
FIGS. 5A to 5C are diagrams for describing a method of manufacturing the multilayer ceramic capacitor according to the first preferred embodiment of the present invention.

Then, the mother multilayer body is cut to a predetermined size by a cutting method such as press cutting, cutting with a dicing machine, or a laser, for example, to obtain a multilayer chip. FIG. 5A is a diagram schematically illustrating a cross-section of a lateral surface of an obtained multilayer chip 40. The multilayer chip 40 has a structure in which a first inner electrode pattern 41 that becomes the first inner electrode after firing and a second inner electrode pattern 42 that becomes the second inner electrode 14 after firing are alternately laminated with a ceramic green sheet 43 that becomes the dielectric layer 12 after firing interposed therebetween.

Figure 5B:
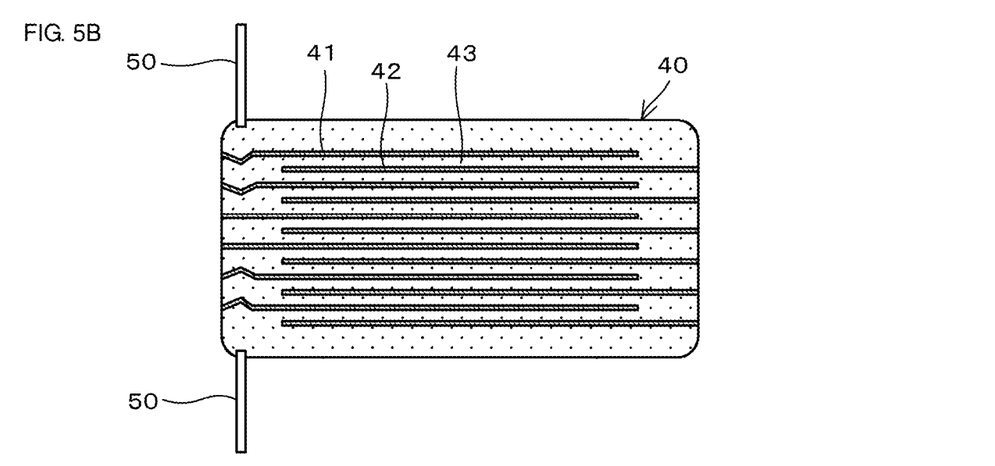

Subsequently, the outer side portion in the length direction L of the multilayer chip 40, which becomes the first extending electrode portion of the first inner electrode after firing, is pre-pressed from a first principal surface and a second principal surface in the lamination direction T toward the inside (see FIG. 5B). The pre-press is performed before a main press. The multilayer chip 40 is sandwiched between two elastic bodies 50 having a plate shape from the first principal surface and the second principal surface in the lamination direction T, and the portion to become the first extending electrode portion after firing is pressed as illustrated in FIG. 5B, for example. The pressure during pre-press is lower than the pressure of the main press which will be described later, and is preferably equal to or less than about 30 MPa, for example.

The first inner electrode pattern 41 is bent inward in the lamination direction T by the pre-press. At this time, the first inner electrode pattern 41 positioned further outside in the lamination direction T has a greater degree of bending as illustrated in FIG. 5B.

Figure 5C:
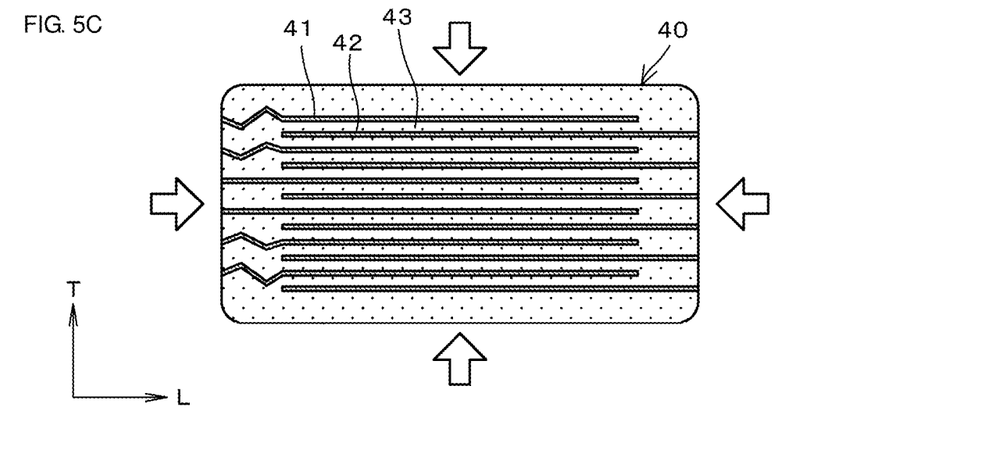

Next, the multilayer chip 40 is subjected to the main press (see FIG. 5C). The main press may be performed by a method such as a rigid press using a heated rigid plate, an elastic body press using an elastic body, or an isostatic press, for example. The temperature during the main press is preferably equal to or higher than about 25° C. and equal to or lower than about 200° C., for example, and the pressure is preferably equal to or greater than about 1 MPa and equal to or less than about 200 MPa, for example. For example, the main press is preferably performed at a pressure of about 103 MPa using an elastic body press.

The main press is performed at least in a direction in which the multilayer chip 40 is sandwiched from the first principal surface and the second principal surface in the lamination direction T and in a direction in which the multilayer chip 40 is sandwiched from a first end surface and a second end surface in the length direction L. In the present preferred embodiment, the main press is also performed in a direction in which the multilayer chip 40 is sandwiched from a first lateral surface and a second lateral surface in the width direction W, in addition to being sandwiched from the first principal surface and the second principal surface in the lamination direction T and from the first end surface and the second end surface in the length direction L described above.

By performing the main press, a flow occurs from a region where the density is high to a region where the density is low in the multilayer chip 40. Thus, by performing the main press in a state where the first inner electrode pattern 41 is deformed by the pre-press, the first inner electrode pattern 41 includes two bent portions that become the first bent portion and the second bent portion after firing.

Subsequently, the conductive paste for an outer electrode is applied to both of the end surfaces, a portion of both of the principal surfaces, and a portion of both the lateral surfaces of the multilayer chip. The conductive paste for an outer electrode includes a metal, or particles made of a precursor of the metal, and a solvent. The conductive paste for an outer electrode may further include a dispersant or a resin component that defines and functions as a binder. The solid content concentration in the conductive paste for an outer electrode is preferably equal to or greater than about 9 vol % and equal to or less than about 20.5 vol %, for example, and the pigment volume concentration (PVC) of the metal particles in the solid components is preferably equal to or greater than about 70% and equal to or less than about 95%, for example.

The multilayer chip is fired, next. The firing temperature is preferably equal to or higher than about 900° C. and equal to or lower than about 1300° C., for example, depending on the ceramic material and the material for the conductive paste used. With this, the multilayer body and the metal layer of the outer electrode are formed.

Note that coating of the conductive paste for an outer electrode and the firing thereof may be made after firing of the multilayer chip.

Thereafter, a plating layer is formed on the surface of the metal layer as needed. To form the plating layer, a Ni plating layer is formed first, and then a Sn plating layer is formed, for example.

The multilayer ceramic capacitor 10 is manufactured through the above-described steps.

Second Preferred Embodiment

The multilayer ceramic capacitor 10 in the first preferred embodiment has a configuration in which the first extending electrode portions 132 of the first inner electrodes 13 at least positioned close to the first principal surface 16*a* and the second principal surface 16*b* in the lamination direction T among all the first inner electrodes 13 include the first bent portion 132*a* and the second bent portion 132*b*.

Figure 6:
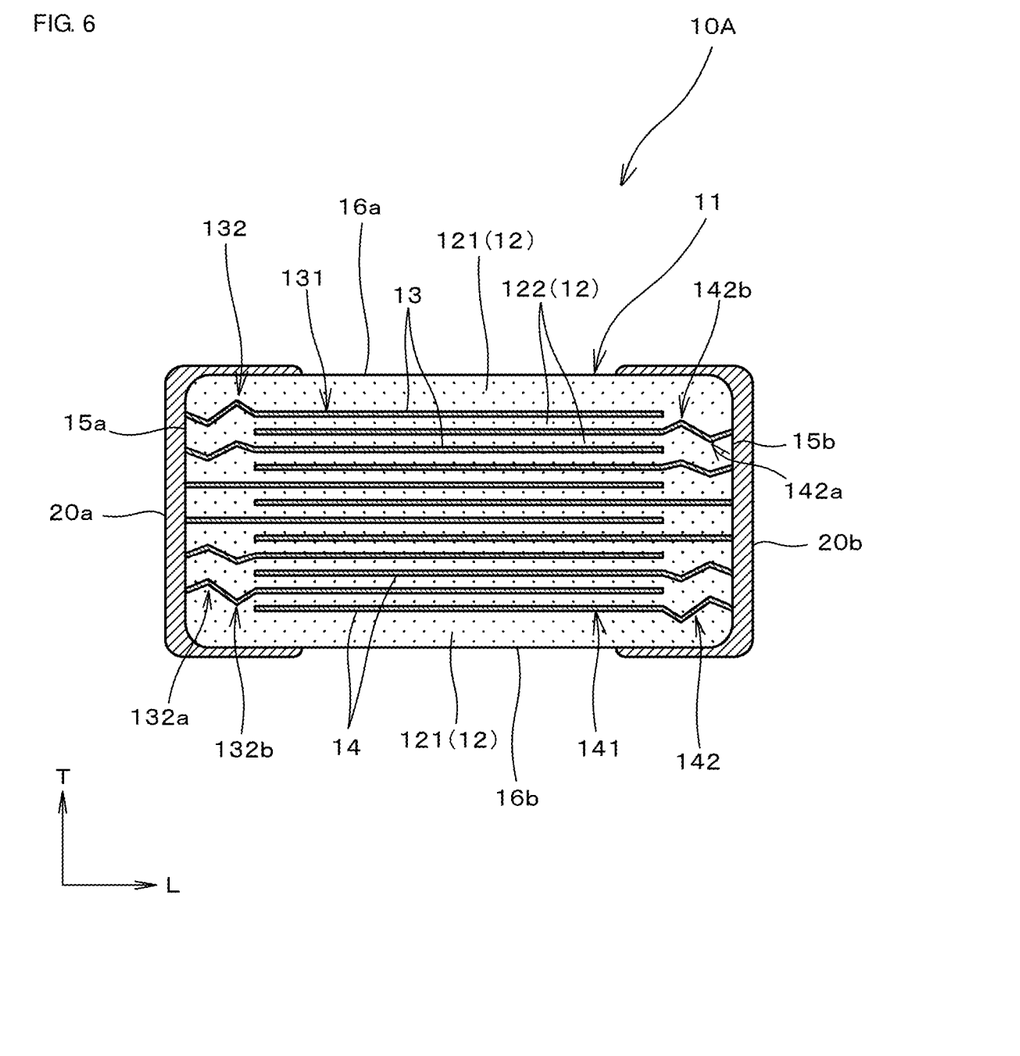
FIG. 6 is a schematic sectional view of a multilayer ceramic capacitor in a second preferred embodiment of the present invention corresponding to the sectional view illustrated in FIG. 2.

In a multilayer ceramic capacitor 10A according to a second preferred embodiment of the present invention, on the other hand, not only the first inner electrode 13 but also the second inner electrode 14 include bent portions.

FIG. 6 is a schematic sectional view of the multilayer ceramic capacitor 10A according to the second preferred embodiment corresponding to the sectional view illustrated in FIG. 2.

The second extending electrode portions 142 of the second inner electrodes 14 at least positioned adjacent to or in a vicinity of the first principal surface 16*a* and the second principal surface 16*b* in the lamination direction T among all of the second inner electrodes 14 include a third bent portion 142*a* and a fourth bent portion 142*b*. The third bent portion 142*a* is bent inward in the lamination direction T, and the fourth bent portion 142b is positioned between the third bent portion 142a and the second opposing electrode portion 141 and is bent outward in the lamination direction T.

The distance between a vertex of the third bent portion 142a and a vertex of the fourth bent portion 142b in the lamination direction T in the second inner electrodes 14 positioned adjacent to or in the vicinity of the first principal surface 16a and the second principal surface 16b in the lamination direction T is larger than the distance in the second inner electrodes 14 positioned in the vicinity of the central portion in the lamination direction T. Further, the second inner electrode 14 positioned further outside in the lamination direction T has a larger distance between the vertex of the third bent portion 142a and the vertex of the fourth bent portion 142b in the lamination direction T.

In the multilayer ceramic capacitor 10A according to the second preferred embodiment, the first extending electrode portion 132 of the first inner electrode 13 includes the first bent portion 132a and the second bent portion 132b, and the second extending electrode portion 142 of the second inner electrode 14 includes the third bent portion 142a and the fourth bent portion 142b. Thus, the separation of the first inner electrode 13 from the dielectric layer 12 may be reduced or prevented, and in addition, the separation of the second inner electrode 14 may also be reduced or prevented. That is, the separation of the first extending electrode portion 132 and the second extending electrode portion 142 from the dielectric layer 12 may be reduced or prevented in an area where the first extending electrode portion 132 and the second extending electrode portion 142 are present and in which the density is lower than an area where the first opposing electrode portion 131 of the first inner electrode 13 and the second opposing electrode portion 141 of the second inner electrode 14 are present in the multilayer body 11.

Further, because the first extending electrode portion 132 of the first inner electrode 13 includes the first bent portion 132a and the second bent portion 132b, and the second extending electrode portion 142 of the second inner electrode 14 includes the third bent portion 142a and the fourth bent portion 142b, it is possible to more effectively reduce or prevent the contraction of the inner electrodes 13 and 14 inward in the length direction L during the firing in the manufacturing process. This makes it possible to more effectively reduce or prevent the occurrence of connection failure between the first inner electrode 13 and the first outer electrode 20a, and the occurrence of a connection failure between the second inner electrode 14 and the second outer electrode 20b.

In the multilayer ceramic capacitor 10A according to the second preferred embodiment, the second extending electrode portions 142 of the second inner electrodes 14 positioned adjacent to or in the vicinity of the first principal surface 16a and the second principal surface 16b in the lamination direction T are connected to the second outer electrode 20b in a direction inclined with respect to the direction in which the first outer electrode 20a and the second outer electrode 20b are opposed to each other. Thus, the separation of the second outer electrode 20b may also be reduced or prevented. That is, the connection area is increased compared with the configuration in which the second extending electrode portion is connected to the second outer electrode in a direction in which the first outer electrode and the second outer electrode are opposed to each other. Thus, it is possible to improve the connectivity between the second inner electrode 14 and the second outer electrode 20b, and the separation of the second outer electrode 20b may be reduced or prevented.

Third Preferred Embodiment

In the multilayer ceramic capacitor 10 according to the first preferred embodiment, the first outer electrode 20a is provided on the first end surface 15a and the second outer electrode 20b is provided on the second end surface 15b of the multilayer body 11.

Figure 7:
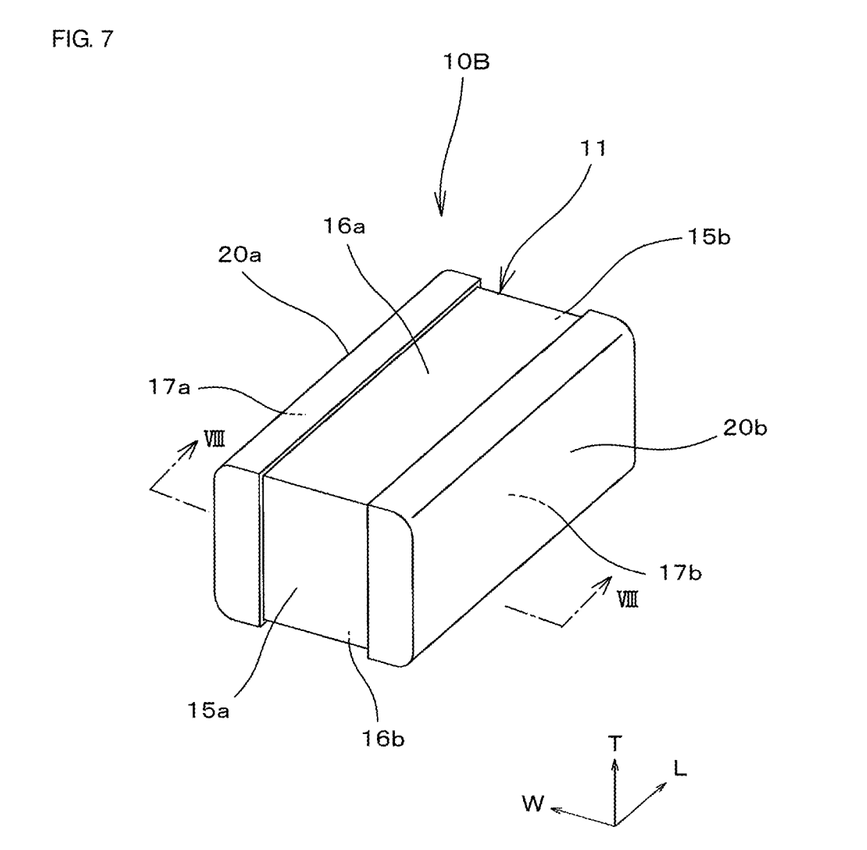
FIG. 7 is a perspective view schematically illustrating a multilayer ceramic capacitor according to a third preferred embodiment of the present invention.
Figure 8:
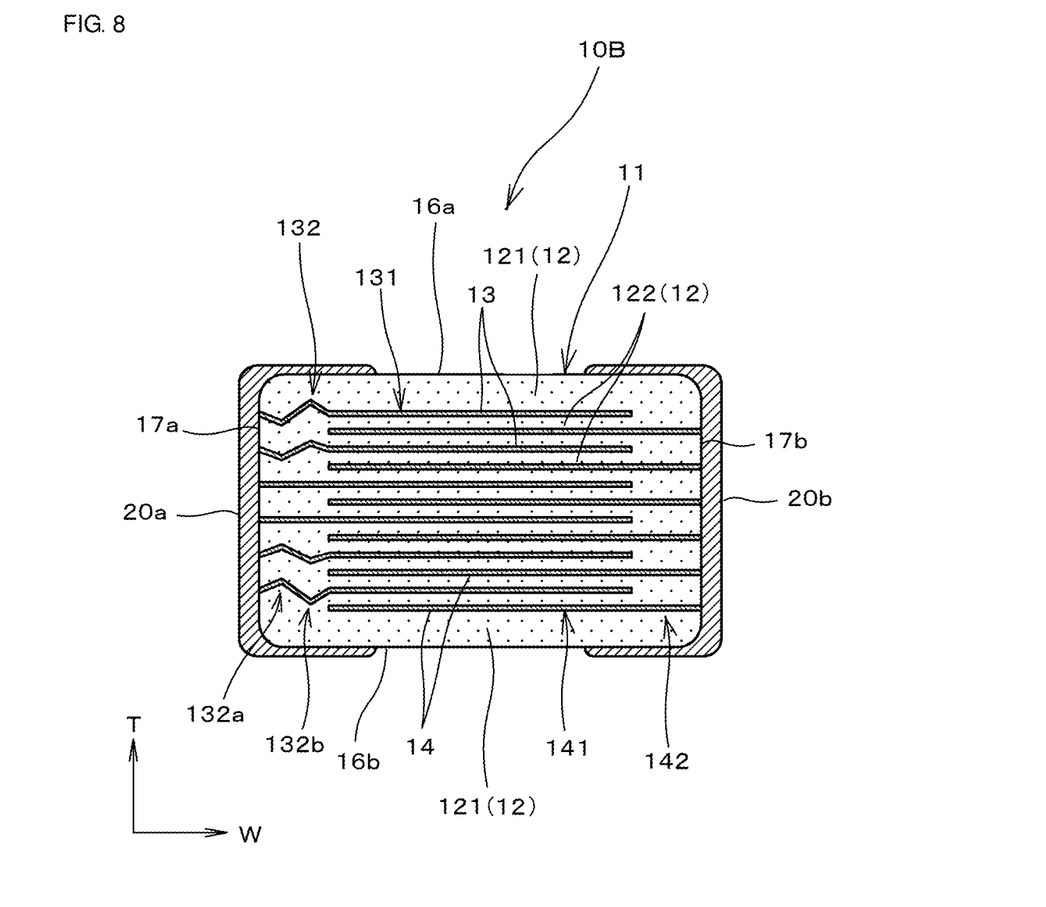
FIG. 8 is a schematic sectional view taken along a line VIII-VIII in the multilayer ceramic capacitor illustrated in FIG. 7.

In a multilayer ceramic capacitor 10B according to a third preferred embodiment of the present invention, on the other hand, the first outer electrode 20a is provided on the first lateral surface 17a and the second outer electrode 20b is provided on the second lateral surface 17b of the multilayer body 11.

FIG. 7 is a perspective view schematically illustrating a multilayer ceramic capacitor 10B according to the third preferred embodiment. FIG. 8 is a schematic sectional view taken along a line VIII-VIII in the multilayer ceramic capacitor 10B illustrated in FIG. 7.

The first outer electrode 20a is provided on the first lateral surface 17a of the multilayer body 11. In the present preferred embodiment, the first outer electrode 20a is provided on the entire or substantially entire first lateral surface 17a of the multilayer body 11, and extends to the first principal surface 16a, the second principal surface 16b, the first end surface 15a, and the second end surface 15b from the first lateral surface 17a. The first outer electrode 20a is electrically connected to the first inner electrode 13.

The second outer electrode 20b is provided on the second lateral surface 17b of the multilayer body 11. In the present preferred embodiment, the second outer electrode 20b is provided on the entire or substantially the entire second lateral surface 17b of the multilayer body 11, and extends to the first principal surface 16a, the second principal surface 16b, the first end surface 15a, and the second end surface 15b from the second lateral surface 17b. The second outer electrode 20b is electrically connected to the second inner electrode 14.

Also in the multilayer ceramic capacitor 10B according to the third preferred embodiment, the first extending electrode portions 132 of the first inner electrodes 13 at least positioned adjacent to or in a vicinity of the first principal surface 16a and the second principal surface 16b in the lamination direction T among all of the first inner electrodes 13 include the first bent portion 132a and the second bent portion 132b. The first bent portion 132a is bent inward in the lamination direction T, and the second bent portion 132b is portioned between the first bent portion 132a and the first opposing electrode portion 131 and is bent outward in the lamination direction T.

The distance between the vertex of the first bent portion 132a and the vertex of the second bent portion 132b in the lamination direction T in the first inner electrodes 13 positioned adjacent to or in the vicinity of the first principal surface 16a and the second principal surface 16b in the lamination direction T is larger than the distance in the first inner electrodes 13 positioned in the central portion in the lamination direction T. Further, the first inner electrode 13 positioned further outside in the lamination direction T has a larger distance between the vertex of the first bent portion 132a and the vertex of the second bent portion 132b in the lamination direction T.

The multilayer ceramic capacitor 10B according to the third preferred embodiment also has the same or substantially the same advantageous effects as that of the multilayer ceramic capacitor 10 according to the first preferred embodiment.

Note that, similarly to the multilayer ceramic capacitor 10A according to the second preferred embodiment, the multilayer ceramic capacitor 10B according to the third preferred embodiment may have a configuration in which the third bent portion and the fourth bent portion are included in the second inner electrode 14.

According to the multilayer ceramic capacitor of the present invention, the first extending electrode portions of the first inner electrodes at least positioned adjacent to or in the vicinity of the first principal surface and the second principal surface in the lamination direction among all of the first inner electrodes include the first bent portion bent inward in the lamination direction and the second bent portion bent outward in the lamination direction. Accordingly, an area in which the first inner electrode and the dielectric layer are in contact with each other is increased, the presence of the first bent portion and the second bent portion generates an anchor effect, and thus the anchor effect may reduce or prevent the separation of the first inner electrode from the dielectric layer.

The present invention is not limited to the above-described preferred embodiments, and various applications and modifications can be made within the scope of the present invention.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including a plurality of dielectric layers and a plurality of first inner electrodes and second inner electrodes that are laminated, and including a first principal surface and a second principal surface opposed to each other in a lamination direction of the dielectric layers, the first inner electrodes, and the second inner electrodes, a first lateral surface and a second lateral surface opposed to each other in a width direction perpendicular or substantially perpendicular to the lamination direction, a first end surface and a second end surface opposed to each other in a length direction perpendicular or substantially perpendicular to the lamination direction and the width direction;
   a first outer electrode electrically connected to the first inner electrodes and provided on a surface of the multilayer body; and
   a second outer electrode electrically connected to the second inner electrodes and provided on a surface of the multilayer body; wherein
   each of the first inner electrodes includes a first opposing electrode portion opposed to the second inner electrodes when viewed in the lamination direction, and a first extending electrode portion extended from the first opposing electrode portion to the first outer electrode;
   the first extending electrode portions of the first inner electrodes at least positioned adjacent to or in a vicinity of the first principal surface and the second principal surface in the lamination direction among all of the first inner electrodes include a first bent portion bent inward in the lamination direction toward a central portion of the laminated body and a second bent portion positioned between the first bent portion and the first opposing electrode portion and bent outward in the lamination direction toward the respective one of the first principal surface and the second principal surface that the corresponding first inner electrode is adjacent to or in the vicinity of;
   a distance between a vertex of the first bent portion and a vertex of the second bent portion in the lamination direction in the first inner electrodes positioned adjacent to or in the vicinity of the first principal surface and the second principal surface in the lamination direction is larger than a distance between any vertices included in first and second bent portions of the first extending electrode portions of the first inner electrodes positioned in the central portion in the lamination direction;
   the vertex of the first bent portion defines an innermost portion of the corresponding first inner electrode in the lamination direction that is closer to the central portion than any other portion of the corresponding first inner electrode; and
   the vertex of the second bent portion defines an outermost portion of the corresponding first inner electrode in the lamination direction that is closer to the respective one of the first and second principal surfaces than any other portion of the corresponding first inner electrode.

2. The multilayer ceramic capacitor according to claim 1, wherein the first inner electrodes positioned closest to the first principal surface and the second principal surfaces in the lamination direction have a largest distance between the vertex of the first bent portion and the vertex of the second bent portion in the lamination direction.

3. The multilayer ceramic capacitor according to claim 1, wherein the first extending electrode portions of the first inner electrodes positioned adjacent to or in the vicinity of the first principal surface and the second principal surface in the lamination direction are connected to the first outer electrode in a direction inclined with respect to a direction in which the first outer electrode and the second outer electrode are opposed to each other.

4. The multilayer ceramic capacitor according to claim 1, wherein
   each of the second inner electrodes includes a second opposing electrode portion opposed to the first inner electrode when viewed in the lamination direction, and a second extending electrode portion extended from the second opposing electrode portion to the second outer electrode;
   the second extending electrode portions of the second inner electrodes at least positioned adjacent to or in a vicinity of the first principal surface and the second principal surface in the lamination direction among all of the second inner electrodes include a third bent portion bent inward in the lamination direction and a fourth bent portion positioned between the third bent portion and the second opposing electrode portion and bent outward in the lamination direction; and
   a distance between a vertex of the third bent portion and a vertex of the fourth bent portion in the lamination direction in the second inner electrodes positioned adjacent to or in the vicinity of the first principal surface and the second principal surface in the lamination direction is larger than the distance in the second inner electrodes positioned in the central portion in the lamination direction.

5. The multilayer ceramic capacitor according to claim 4, wherein the second inner electrode positioned closest to the first principal surface and the second principal surface in the lamination direction have a largest distance between the vertex of the third bent portion and the vertex of the fourth bent portion in the lamination direction.

6. The multilayer ceramic capacitor according to claim 4, wherein the second extending electrode portions of the second inner electrodes positioned adjacent to or in the vicinity of the first principal surface and the second principal surface in the lamination direction are connected to the second outer electrode in a direction inclined with respect to the direction in which the first outer electrode and the second outer electrode are opposed to each other.

7. The multilayer ceramic capacitor according to claim 1, wherein the first and second outer electrodes are provided on the first and second end surfaces of the multilayer body, respectively.

8. The multilayer ceramic capacitor according to claim 7, wherein
the first outer electrode extends from the first end surface onto the first and second principal surfaces and the first and second lateral surfaces of the multilayer body; and
the second outer electrode extends from the second end surface onto the first and second principal surfaces and the first and second lateral surfaces of the multilayer body.

9. The multilayer ceramic capacitor according to claim 1, wherein the first and second outer electrodes are provided on the first and second lateral surfaces of the multilayer body, respectively.

10. The multilayer ceramic capacitor according to claim 1, wherein
the first outer electrode extends from the first lateral surface onto the first and second principal surfaces and the first and second end surfaces of the multilayer body; and
the second outer electrode extends from the second lateral surface onto the first and second principal surfaces and the first and second end surfaces of the multilayer body.

11. The multilayer ceramic capacitor according to claim 1, wherein the dielectric layers are made of a ceramic material including $BaTiO_3$, $CaTiO_3$, $SrTiO_3$, $SrZrO_3$, or $CaZrO_3$ as a main component.

12. The multilayer ceramic capacitor according to claim 11, wherein the dielectric layers further include a Mn compound, an Fe compound, a Cr compound, a Co compound, or a Ni compound that is lower in content than the main component.

13. The multilayer ceramic capacitor according to claim 1, wherein a thickness of each of the dielectric layers is about 0.3 μm and equal to or less than about 100 μm.

14. The multilayer ceramic capacitor according to claim 1, wherein the first and second inner electrodes are in parallel or substantially in parallel to the first and second principal surfaces of the multilayer body.

15. The multilayer ceramic capacitor according to claim 1, wherein the first and second inner electrodes include at least one of Ni, Cu, Ag, Pd, Pt, Fe, Ti, Cr, Sn, or Au, or an alloy including any of Ni, Cu, Ag, Pd, Pt, Fe, Ti, Cr, Sn, or Au.

16. The multilayer ceramic capacitor according to claim 1, wherein the distance between the vertex of the first bent portion and the vertex of the second bent portion in the first inner electrode positioned in an outermost portion of the multilayer body in the lamination direction is equal to or greater than about 5 μm and equal to or less than about 40 μm.

17. The multilayer ceramic capacitor according to claim 4, wherein the distance between the vertex of the third bent portion and the vertex of the fourth bent portion in the second inner electrode positioned in an outermost portion of the multilayer body in the lamination direction is equal to or greater than about 5 μm and equal to or less than about 40 μm.

* * * * *